(12) United States Patent
Srinivasan et al.

(10) Patent No.: US 10,984,043 B2
(45) Date of Patent: Apr. 20, 2021

(54) METHOD FOR FACETED VISUALIZATION OF A SPARQL QUERY RESULT SET

(71) Applicant: Oracle International Corporation, Redwood Shores, CA (US)

(72) Inventors: Jagannathan Srinivasan, Nashua, NH (US); Juan Francisco Garcia Navarro, Jalisco (MX); Victor Antonio Lopez Villamar, Jalisco (MX); Matthew Steven Perry, Brookline, NH (US); Souripriya Das, Nashua, NH (US); Zhe Wu, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 492 days.

(21) Appl. No.: 15/059,864

(22) Filed: Mar. 3, 2016

(65) Prior Publication Data

US 2017/0098009 A1    Apr. 6, 2017

Related U.S. Application Data

(60) Provisional application No. 62/236,803, filed on Oct. 2, 2015.

(51) Int. Cl.
*G06F 16/838* (2019.01)
*G06F 16/81* (2019.01)
(Continued)

(52) U.S. Cl.
CPC .......... *G06F 16/838* (2019.01); *G06F 16/80* (2019.01); *G06F 16/81* (2019.01); *G06F 16/9024* (2019.01)

(58) Field of Classification Search
CPC ......... G06F 17/30941; G06F 17/30911; G06F 16/838; G06F 16/81; G06F 16/80; G06F 16/9024
See application file for complete search history.

(56) References Cited

U.S. PATENT DOCUMENTS 4,782,325 A    11/1988 Jeppsson et al.
5,742,792 A    4/1998 Yanai et al.
(Continued)

FOREIGN PATENT DOCUMENTS

EP    2 608 070 A1    6/2013
GB    1 332 631 A    10/1973
WO    WO2007/078444 A1    7/2007

OTHER PUBLICATIONS http://www.w3C.org/TR/2008/REC-rdf-sparql-query-20080115/#docConventions (Year: 2008).*
(Continued)

*Primary Examiner* — Matthew J Ellis
(74) *Attorney, Agent, or Firm* — Hickman Becker Bingham Ledesma LLP

(57) ABSTRACT

Embodiments use successive refinement to allow a user to systematically explore the result set of an arbitrary query over RDF, such as a SPARQL query. A user inputs an arbitrary base query and modifies this query by replacing selected variables with values to which each selected variable is bound within the result set of the base query. Embodiments present, via a GUI, variable facets that may be substituted for query variables. Embodiments also present, through a GUI, a query history graph that represents query versions that a user has created. A user may navigate this query history graph to return to previously-created query versions. The GUI also provides information about the facets, including a number of results that would be included in the result set of the query version resulting from substitution of the facet for the associated variable.

18 Claims, 12 Drawing Sheets

(51) Int. Cl.
*G06F 16/80* (2019.01)
*G06F 16/901* (2019.01)

(56) References Cited

U.S. PATENT DOCUMENTS

| | | | |
|---|---|---|---|
| 5,778,430 | A | 7/1998 | Ish et al. |
| 5,870,759 | A | 2/1999 | Bauer et al. |
| 6,009,432 | A | 12/1999 | Tarin |
| 7,149,769 | B2 | 12/2006 | Lubbers et al. |
| 8,433,684 | B2 | 4/2013 | Munoz |
| 8,577,911 | B1* | 11/2013 | Stepinski .............. G06F 16/3325 707/765 |
| 8,856,484 | B2 | 10/2014 | Ben-Tsion et al. |
| 9,292,564 | B2 | 3/2016 | Kamp et al. |
| 2005/0055380 | A1 | 3/2005 | Thompson et al. |
| 2005/0165798 | A1 | 7/2005 | Cherkauer et al. |
| 2006/0173833 | A1 | 8/2006 | Purcell et al. |
| 2007/0156957 | A1 | 7/2007 | McHardy et al. |
| 2008/0059492 | A1 | 3/2008 | Tarin |
| 2008/0256250 | A1 | 10/2008 | Wakefield |
| 2008/0281784 | A1 | 11/2008 | Zane et al. |
| 2008/0281865 | A1 | 11/2008 | Price et al. |
| 2009/0307290 | A1 | 12/2009 | Barsness et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0138123 | A1 | 6/2011 | Aditya et al. |
| 2012/0124478 | A1* | 5/2012 | King ................. G06F 17/30943 715/738 |
| 2012/0173515 | A1 | 7/2012 | Jeong et al. |
| 2012/0323971 | A1 | 12/2012 | Pasupuleti |
| 2014/0040218 | A1 | 2/2014 | Kimura et al. |
| 2014/0059455 | A1* | 2/2014 | Abdukalykov ..... G06F 3/04842 715/764 |
| 2014/0075493 | A1 | 3/2014 | Krishnan et al. |
| 2014/0279957 | A1* | 9/2014 | Moore .............. G06F 17/30572 707/692 |
| 2014/0310302 | A1* | 10/2014 | Wu .................... G06F 16/2453 707/769 |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2016/0072899 | A1* | 3/2016 | Tung ...................... H04L 41/12 709/223 |
| 2016/0350404 | A1* | 12/2016 | Smith ................... G06F 16/334 |
| 2016/0364478 | A1* | 12/2016 | Devarao ........... G06F 17/30371 |
| 2017/0061001 | A1* | 3/2017 | Tonkin .............. G06F 17/30672 |

OTHER PUBLICATIONS

User's Manual for the Examiners Automated Search Tool (EAST) 2.1, pp. 6-57 and 6-76 (Year: 2006).*

Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Nirmesh, Malviya, "Recovery Algorithms for In-Memory OLTP Databases", Master of Science Thesis, dated Jul. 1, 2012, 66 pages.
Khalid Sayood:, "Introduction to data Compression", Morgan Kaufmann Publisher, dated Dec. 1996, 4 pages.
Farber et al., "SAP HANA Database—Data Management for Modern Business Applications", SIGMOD Record, dated Dec. 2011, vol. 40, No. 4, 8 pages.
U.S. Appl. No. 14/337,179, filed 074/21/2014, Notice of Allowance dated Jul. 29, 2015.
U.S. Appl. No. 14/337,179, filed Jul. 21, 2014, Office Action dated Dec. 29, 2014.
U.S. Appl. No. 14/337,179, filed Jul. 21, 2014, Notice of Allowance, dated Nov. 3, 2015.
U.S. Appl. No. 14/337,179, filed Jul. 21, 2014, Interview Summary dated Jun. 17, 2015.
U.S. Appl. No. 14/337,179, filed Jul. 21, 2014, Final Office Action dated Apr. 10, 2015.
Wu, Zhe, "Oracle Graph: Graph Features of Oracle Database 12c", Oracle Spatial & Graph, dated Feb. 2014, 57 pages.
Wikipedia, the free encyclopedia, "Google Maps", https://en.wikipedia.org/wiki/Google_Maps, dated 2015, 25 pages.
What is Cytoscape?, http://www.cytoscape.org/what_is_cytoscape.html, dated Mar. 28, 2013, 12 pages.
Schwikowski, Benno, "Cytoscape: Visualization and Analysis o Omics Data in Interaction Networks", https://research.pasteur.fr/en/software/cytoscape/, dated Jun. 2015, 3 pages.
Ritchie Lab, "Network Visualization: Cytoscape", Center for Systems Genomics, dated Sep. 13, 2014, 17 pages.
Ravada, Siva, "Big Data Spatial Performance with Oracle Database 12c", A Practitioner's Panel, dated Sep.-Oct. 2014, 45 pages.
Neo4j Graph Database Platform, "Inside Analysis: The Graph Database and the RDF Database", dated Jan. 8, 2015, 5 pages.
Lopez et al., "Coolest Graph Features in Oracle Database 12c", Oracle, dated 2014, 44 pages.
"IBM DB2, RDF Stores", IBM Watson Explorer 11.0.2, "IBM Specturm Scale", https://www.ibm.com/support/knowledgecenter/en/SS8NLW_11.0.2/com.ibm.discovery.es.ad.doc/iiysatdf.html, dated May 30, 2014, 6 pages.
Heim et al., "Facet Graphs: Complex Semantic Querying Made Easy", ESWC 2010, Part I, LNCS 6088, dated 2010, 15 pages.
Hearst et al., "Finding the Flow in Web Site Search", ACM, dated Sep. 2002, 6 pages.
Flores et al., "Graphium Chrysalis: Exploiting Graph Database Engines to Analyze RDF Graphs", V. Presutti et al. (Eds.): ESWC Satellite Events, dated 2014, LNCS 8798, 6 pages.
bobdc.blog, "Storing and querying RDF in Neo4j", Bob DuCharme's weblog, mostly on technology, www.snee.com/bobdc.blog/2014/01/storing-and-querying-rdf-in-ne.html, dated Jan. 7, 2014, 4 pages.
Amazon.com, "Amazon Interface", dated 2015, 1 page.

* cited by examiner

202
RECEIVE, FROM A PARTICULAR CLIENT, INFORMATION FOR A BASE RDF QUERY THAT COMPRISES A SET OF ONE OR MORE TRIPLE PATTERNS

204
COMPUTE A BASE RESULT SET FOR THE BASE RDF QUERY

206
DETERMINING, FOR A PARTICULAR VARIABLE IN THE BASE RDF QUERY, A SET OF POSSIBLE VALUES THAT ARE INCLUDED IN THE BASE RESULT SET

208
CAUSE DISPLAY, IN A GRAPHICAL USER INTERFACE, OF ONE OR MORE OF THE SET OF POSSIBLE VALUES FOR THE PARTICULAR VARIABLE IN THE BASE RDF QUERY

210
RECEIVE, VIA THE GRAPHICAL USER INTERFACE, INFORMATION INDICATING USER SELECTION OF A PARTICULAR VALUE OF THE SET OF POSSIBLE VALUES FOR THE PARTICULAR VARIABLE

212
IN RESPONSE TO RECEIVING THE INFORMATION INDICATING USER SELECTION OF THE PARTICULAR VALUE, DETERMINE AN UPDATED RDF QUERY BASED, AT LEAST IN PART, ON THE BASE RDF QUERY AND THE PARTICULAR VALUE

214
COMPUTE AN UPDATED RESULT SET FOR THE UPDATED RDF QUERY

216
PROVIDE INFORMATION FOR SAID UPDATED RESULT SET TO THE PARTICULAR CLIENT

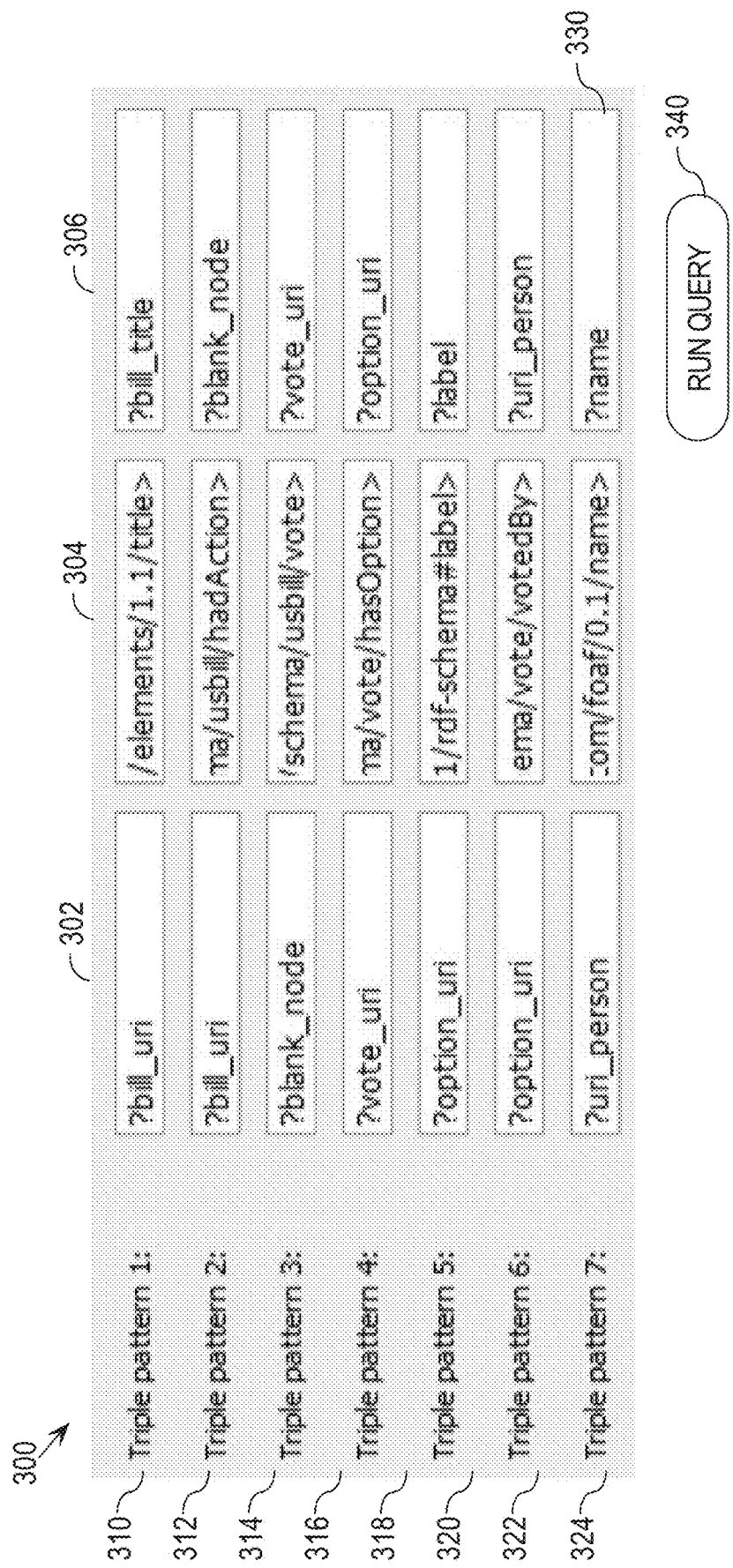

FIG. 4
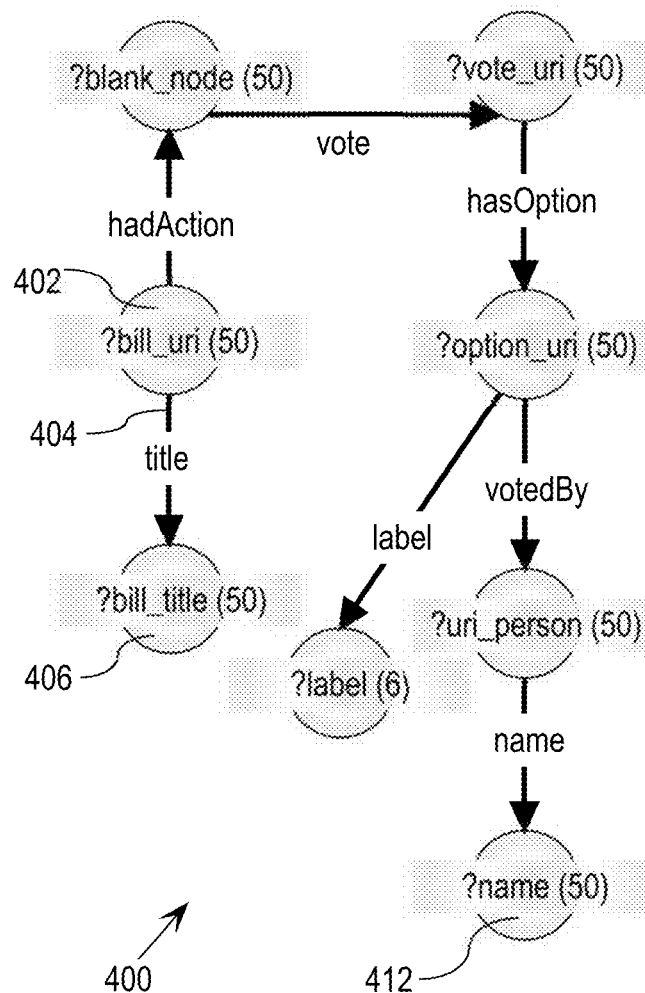

FIG. 6
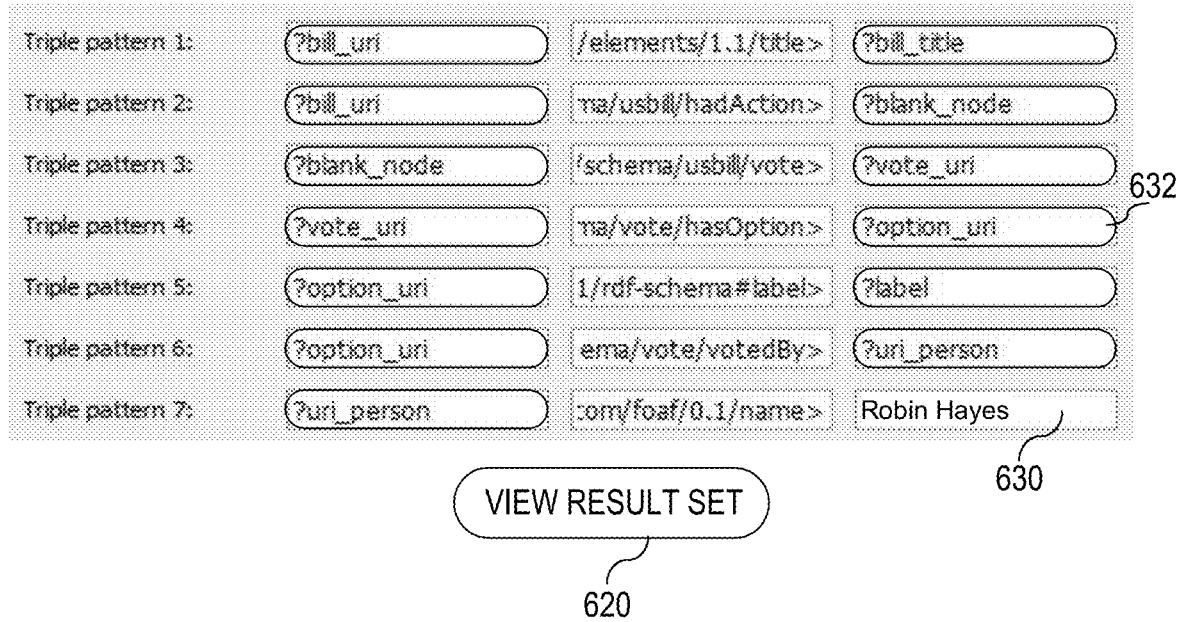
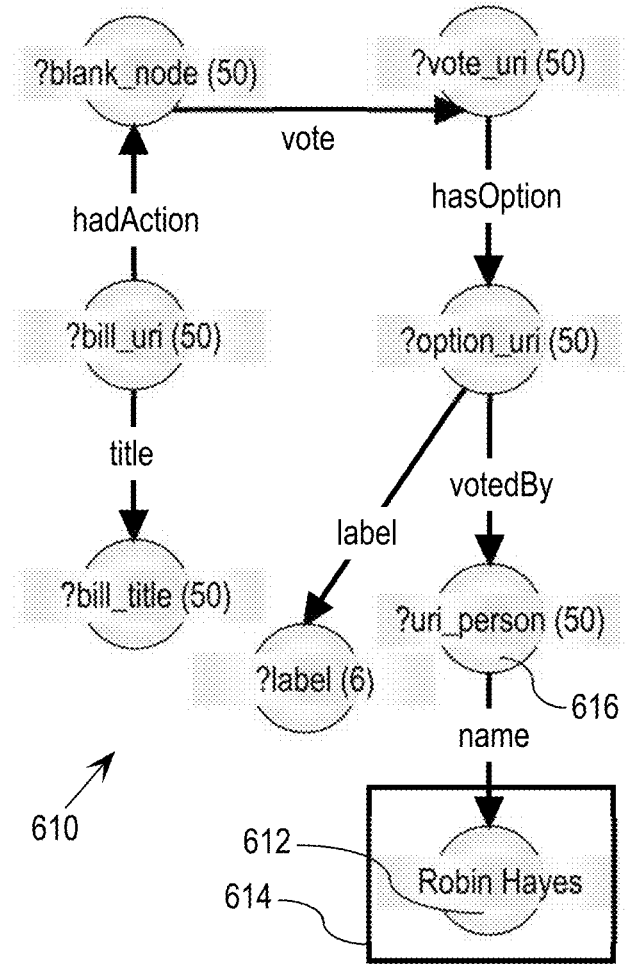

802 — RECEIVE, FROM A PARTICULAR CLIENT, INFORMATION FOR A FIRST RDF QUERY VERSION

804 — IN RESPONSE TO RECEIVING THE INFORMATION FOR THE FIRST RDF QUERY VERSION, CAUSE DISPLAY, AT A GRAPHICAL USER INTERFACE, OF A FIRST GRAPHICAL CONTROL THAT REPRESENTS THE FIRST RDF QUERY VERSION

806 — AFTER RECEIVING THE INFORMATION FOR THE FIRST RDF QUERY VERSION, RECEIVE SECOND INFORMATION FOR A SECOND RDF QUERY VERSION; WHEREIN THE SECOND RDF QUERY VERSION IS BASED ON THE FIRST RDF QUERY VERSION; WHEREIN, IN THE SECOND RDF QUERY VERSION, A PARTICULAR VALUE IS SUBSTITUTED FOR A PARTICULAR VARIABLE INCLUDED IN THE FIRST RDF QUERY VERSION

808 — IN RESPONSE TO RECEIVING THE SECOND INFORMATION FOR THE SECOND RDF QUERY VERSION: CAUSE DISPLAY, AT THE GRAPHICAL USER INTERFACE, OF BOTH THE FIRST GRAPHICAL CONTROL AND A SECOND GRAPHICAL CONTROL THAT REPRESENTS THE SECOND RDF QUERY VERSION, WHEREIN THE SECOND GRAPHICAL CONTROL IS DISTINCT FROM THE FIRST GRAPHICAL CONTROL

METHOD FOR FACETED VISUALIZATION OF A SPARQL QUERY RESULT SET

BENEFIT CLAIM; CROSS-REFERENCE TO RELATED APPLICATIONS

This application claims the benefit, under 35 U.S.C. § 119(e), of Provisional Appln. No. 62/236,803, titled "A Method for Faceted Visualization of a SPARQL Query Set over Large RDF Graphs" and filed Oct. 2, 2015, the entire contents of which is hereby incorporated by reference as if fully set forth herein.

This application is related to application Ser. No. 14/337,179, titled "Mirroring, In Memory, Data From Disk To Improve Query Performance", filed Jul. 21, 2014, the entire contents of which is hereby incorporated by reference as if fully set forth herein.

FIELD OF THE INVENTION

The present invention relates to querying RDF data, and, more specifically, to visualizing information for an arbitrary RDF query to facilitate refinement of the query and, accordingly, of the resulting data set returned by the query.

BACKGROUND

In an RDF data model, the data is modeled as labeled and directed graphs, represented as a set of triples. The nodes in the graph are used to represent two parts of a given triple, and the third part is represented by a directed link (or edge) that describes the relationship between the nodes. In the context of an RDF expression, the two nodes are referred to as "subject" and "object" and the link describing the relationship is referred to as "predicate".

The subject and object of a particular RDF expression may be resources that are identified by Uniform Resource Identifiers (URIs). A predicate is also represented by a URI. Furthermore, instead of a resource referenced by URI, the object of a particular RDF expression may be a literal of some data type, e.g., "xsd:string", "xsd:integer", "xsd:float", "xsd:double", "xsd:boolean", "xsd:dateTime", "xsd:decimal", etc.

SPARQL, which stands for SPARQL Protocol and RDF Query Language, is an example of an RDF query language. SPARQL is based on triple graph pattern matching and was standardized by the W3C in January 2008 and updated in March 2013. In a SPARQL triple graph pattern, any or all of the subject, object, and predicate may be a variable. (See "SPARQL Query Language for RDF," W3C Recommendation 15 January 2008, found at the time of writing this specification in the folder TR/rdf-sparql-query/at the domain www.w3.org, the entirety of which is incorporated by reference herein. See also "SPARQL 1.1 Overview," W3C Recommendation 21 Mar. 2013, found at the time of writing this specification in the folder TR/sparql11-overview/at the domain www.w3.org, the entirety of which is incorporated by reference herein.)

The W3C recommendation for SPARQL indicates that "[a] basic graph pattern matches a subgraph of the RDF data when RDF terms from that subgraph may be substituted for the variables and the result is RDF graph equivalent to the subgraph." (See "SPARQL Query Language for RDF," W3C Recommendation 15 Jan. 2008.) The W3C recommendation further states "Graph pattern matching produces a solution sequence, where each solution has a set of bindings of variables to RDF terms. SPARQL filters restrict solutions to those for which the filter expression evaluates to TRUE." (See "SPARQL 1.1 Overview," W3C Recommendation 21 Mar. 2013.)

It can be difficult to predict the amount of data that will be included in the result of a given query, let alone the actual content of the result set. For example, when joins are performed over the data of any kind of data set, including RDF data sets, the results can be arbitrarily large. In fact, the result set of a query that performs joins can be larger than the data set over which the query is run. To illustrate, for the most common conjunctive triple pattern SPARQL query, the result set could be potentially larger than the original RDF dataset because computation of the result set would require self-joins on the original RDF dataset. The ability of a user to parse through the result set of a query, especially when the result set is large, can be limited because of the overwhelming amount of data.

Also, computation time required to process such large result sets can present problems for service providers and users. Many times, the time it takes to calculate responses to requests for data from very large data sets is hard to estimate and users become frustrated waiting for responses. One way that service providers limit response time from the user's point of view is by pre-computing result sets for particular queries over a large data set and then providing users with options to view the pre-computed results. While this allows service providers to display results to users very quickly, the users are limited to viewing result sets of the pre-computed queries.

Providing users with the ability to explore arbitrary results from large RDF datasets is a growing requirement. Furthermore, visualization of RDF result sets is a key method of result delivery for RDF data. However, visualization of very large result sets, e.g., that include on the order of a million triples or more, in the approximately one million pixels available in a typical monitor can be overwhelming for a user. Generally, a visualized graph of an RDF result data set is limited to 10,000 displayed units or less (where a displayed unit is generally a visualization of an edge or a visualization of a node of the visualized graph) in order to allow the user to be able to distinguish the individual displayed units in the graph. At times, even 10,000 displayed units is too much for a user to fully grasp or utilize.

Because of the advisability of keeping the size of a visualized graph relatively small, it would be beneficial to provide a systematic, faceted approach to explore data identified by an arbitrary RDF query to provide information about what will be included in a graph of the result set. The ability to systematically explore an RDF query in the context of information from the result set that the query produces would allow a user to intelligently select what subset, of the result set for a given RDF query, is displayed in the visualized result graph.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for incrementally refining a user-supplied query via a graphical user interface.

FIG. 3 depicts a graphical user interface that is configured to receive information from a user that defines an RDF query.

FIG. 4 depicts a query version control display that includes a base query graph that depicts the base query version, and also includes a query refinement graphical user interface populated with information for the base query.

FIG. 6 depicts a query refinement graphical user interface and a query graph that are populated with information for an updated working query version.

FIG. 8 depicts a flowchart for producing a query history graph that represents versions of a base query submitted by a user.

DETAILED DESCRIPTION

Figure 1:
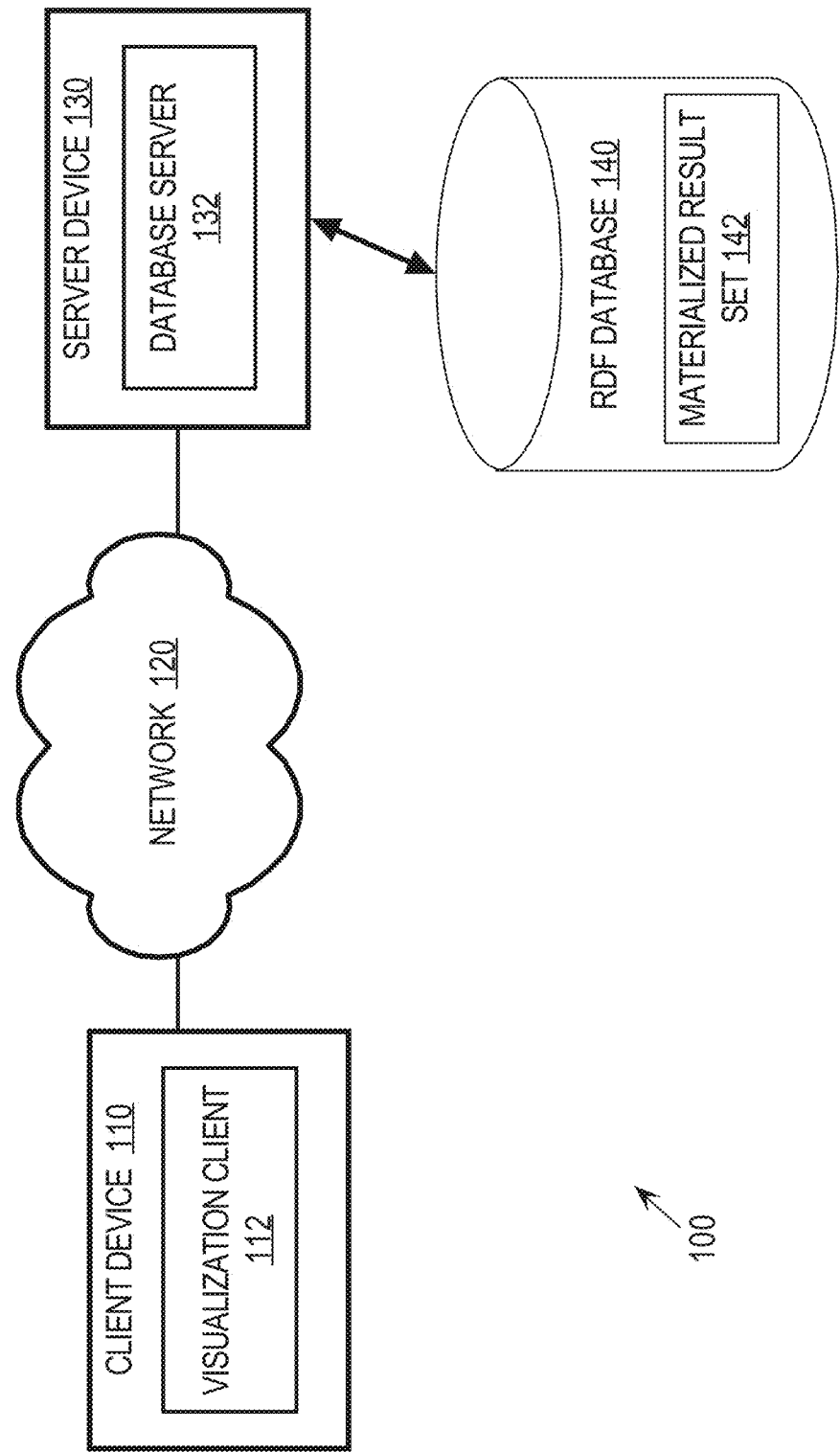
FIG. 1 is a block diagram that depicts an example network arrangement for allowing user refinement and automatic visualization of the result set of an arbitrary RDF query that is input by the user.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments use a successive refinement approach to allow a user to systematically explore the result set of an arbitrary RDF query. Specifically, embodiments allow a user to input an arbitrary base query and then modify the base query by replacing one or more selected variables with one or more values to which each selected variable is bound within the result set of the base query. A value to which a variable of a query is bound in the result set of the query is referred to herein as a "facet" of the variable. Variable replacement allows the user to explore a refined result set, for the base query, consisting of only those solutions from the base result set that include the selected one or more values bound to the replaced variables.

This successive refinement of an arbitrary RDF query allows the user to systematically explore the possible queries that can be arrived at by substituting a variable facet for 0 or more of the k variables in the query. More specifically, there are $(m_1+1)*(m_2+1)* \ldots *(m_k+1)$ possible queries that may be arrived at by substituting variable facets in a given base query, where $m_i$ is the total number of possible facets for a variable i in the query. This formula represents the product of the total number of choices (i.e., number of possible facets plus one for no substitution) for each of the k variables in the query. The result set for each of the queries obtained by successive refinement of a base RDF query will be a subset of the base result set of the base RDF query.

In this manner, the user may replace as many variables as desired within the base query to explore limited subsets of the base result set. In fact, a user may view a result graph depicting the result set for any version of the query created by the user, thus allowing the user to inspect, at will, given subsets of the original result set. Such functionality allows a user to intelligently pare down an arbitrary query's result set, which may originally be very large, into smaller subsets of information.

Embodiments visually present, via a graphical user interface (GUI), variable facets that may be substituted for variables in a base query. The GUI also provides information about individual facets, including a number of results that would be included in the result set of the query version resulting from substitution of the variable with the facet.

Embodiments also visually present, through a GUI, a query history graph that represents a set of query versions that a user has created based on substitutions to variables in the user-input query. A user may navigate this query history graph to return to previously-created query versions, i.e., by causing a selected query version to be displayed in a GUI that allows the user to further manipulate the selected query version and/or display the result set of the selected query version, etc.

Architecture for Successive Refinement of an Arbitrary RDF Query

FIG. 1 is a block diagram that depicts an example network arrangement 100 for allowing user refinement and automatic visualization of the result set of an arbitrary RDF query that is input and refined by the user, according to embodiments. Network arrangement 100 includes a client device 110 and a server device 130 communicatively coupled via a network 120. Example network arrangement 100 may include other devices, including client devices, server devices, storage devices, and display devices, according to embodiments.

Client device 110 may be implemented by any type of computing device that is communicatively connected to network 120 and that is capable of running a visualization client 112. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with visualization client 112. Visualization client 112 may be implemented in any number of ways, including as a stand-alone application running on client device 110, or as a plugin to a browser running at client device 110, etc. Visualization client 112 may be implemented by one or more logical modules. Client device 110 may be configured with other mechanisms, processes and functionalities, depending upon a particular implementation.

Network 120 may be implemented with any type of medium and/or mechanism that facilitates the exchange of information between client device 110 and server device 130. Furthermore, network 120 may facilitate use of any type of communications protocol, and may be secured or unsecured, depending upon the requirements of a particular embodiment.

According to embodiments, server device 130 is implemented by any type of computing device that is capable of communicating with client device 110 over network 120 and also capable of running a database server 132. In network arrangement 100, server device 130 is configured with database server 132, which implements a database management system (DBMS) for an RDF database 140. Database server 132 may be implemented by one or more logical modules, and is described in further detail below. Server device 130 may be configured with other mechanisms, processes and functionalities, depending upon a particular implementation.

According to embodiments, there may be other database server instances, other than database server 132, that collectively implement a DBMS with database server 132, i.e., a multi-node DBMS. Specifically, in a multi-node DBMS, resources from multiple nodes can be allocated to run a particular database server's software.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients (such as visualization client 112 on client device 110).

Server device 130 accesses RDF database 140. According to an embodiment, this access comprises access to a set of disk drives (on or accessible by server device 130) and to data blocks stored thereon. RDF database 140 may reside in any type of storage, including volatile and non-volatile storage, e.g., random access memory (RAM), one or more hard disks, main memory, etc.

RDF database 140 may be implemented in any manner that allows RDF database functionality. According to embodiments, RDF database 140 is implemented as an application running on top of a relational database host system, where the relational database host system stores data for RDF database 140 and queries the data using a relational query language such as Structured Query Language (SQL). According to these embodiments, RDF database 140 translates data from the relational database host system into RDF format and translates RDF queries into SQL for the host system to run.

According to embodiments, RDF database 140 comprises data stored in relational tables that is viewed as RDF data via RDF View mapping. RDF View mapping maps the relational data to RDF-type data such that SPARQL queries can be issued against the RDF View of relational data. The relational data may be traditional relational data and/or data for Property Graphs stored in edges and nodes tables.

According to embodiments, RDF database 140 is an RDF database system that stores data in RDF format and that natively runs RDF queries over the stored data.

One or more of the functions attributed to database server 132 and/or to visualization client 112 herein may be performed by any other logical entity that may be running on any device that is communicatively coupled to network 120. According to embodiments, one or more of the processes and/or functionality described in connection with visualization client 112, database server 132, and/or RDF database 140 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

User-Supplied RDF Query

Embodiments allow a user to input an arbitrary RDF query, which is arbitrary in that the RDF query is defined entirely by the user. The ability to input an arbitrary RDF query allows the user to explore the data in RDF database 140 in any manner that is able to be described in an RDF query.

The query in SPARQL can take two forms: SPARQL SELECT query and SPARQL CONSTRUCT query. A SPARQL SELECT query returns solution bindings, and a SPARQL CONSTRUCT query returns a graph, which is formed by substituting solution bindings, produced by the CONSTRUCT query, in the CONSTRUCT template pattern.

The CONSTRUCT query form allows showing of one or more portions of the returned graph, as well as allowing construction of new edges, in the returned graph, on the fly. In both SPAQRL SELECT queries and SPARQL CONSTRUCT queries, conjunctive triple patterns form a building block, which is referred to as Basic Graph Pattern (BGP). The BGPs can in turn to be used to form more complex patterns using OPTIONAL, UNION, etc. Below is an example of the same query pattern used in both a SPARQL SELECT query and a SPARQL CONSTRUCT query:

```
SELECT ?dn ?dos ?ind
WHERE {
    ?drug a db:Drug .
    ?drug rdfs:label ?dn .
    OPTIONAL {?drug db:dos ?dos . }
    OPTIONAL {?drug db:ind ?ind . }
}
CONSTRUCT {
    ?drug rdfs:label ?dn .
    ?drug db:dos ?dos .
    ?drug db:ind ?ind }
WHERE {
    ?drug a db:Drug .
    ?drug rdfs:label ?dn .
    OPTIONAL {?drug db:dos ?dos . }
    OPTIONAL {?drug db:ind ?ind . }
}
```

According to embodiments, the SPARQL CONSTRUCT formulation is used to implement queries submitted by a user through graphical user interfaces described below, which formulation provides information for query graphs also described in further detail below. Embodiments allow a user to input any arbitrarily complex SPARQL CONSTRUCT query, which can be represented as an Abstract-Syntax-Tree (AST). According to such embodiments, variables may represent the NULL value (as a valid value), which can occur when OPTIONAL or UNION constructs are used.

FIG. 2 depicts a flowchart 200 for incrementally refining a user-supplied query using a graphical user interface. At step 202 of flowchart 200, information for a base RDF query, that comprises a set of one or more triple patterns, is received from a particular client. For example, visualization client 112 receives, via a graphical user interface such as RDF query definition GUI 300 of FIG. 3, a set of triple patterns that define an RDF query. The RDF query that is defined by the RDF query definition information that is initially submitted to visualization client 112 is referred to herein as the "base query" or "base query version" for ease of explanation. This base query may be adjusted in any number of ways to create versions of the base query, as described in further detail below.

Visualization client 112 may receive any type of information that defines a base RDF query. According to embodiments, visualization client 112 receives (through a GUI, SOAP message, or other type of communication) information defining the base RDF query that includes data manipulation language or subquery constructs. For example, the information defining the base RDF query utilizes BGPs as building blocks that are connected via subquery constructs such as SPARQL UNION, SPARQL OPTIONAL, etc. To illustrate, visualization client 112 receives one of the following SPARQL queries as information defining the base RDF query:

```
SELECT ?dn ?dosage ?ind
WHERE {
  ?drug a db:Drug .
  ?drug rdfs:lab ?dn .
  OPTIONAL {?drug db:dos ?dos . }
  OPTIONAL {?drug db:ind ?ind . }
}
CONSTRUCT {
  ?drug rdfs:label ?dn .
  ?drug db:dos ?dos .
  ?drug db:ind ?ind }
WHERE {
  ?drug a db:Drug .
  ?drug rdfs:label ?dn .
  OPTIONAL {?drug db:dos ?dos . }
  OPTIONAL {?drug db:ind ?ind . }
}
SELECT DISTINCT ?lab ?proc
WHERE {
  { ?proc obo:part_of go:gkk }
  UNION
  { ?proc rdfs:subClassOf go:gkk}
  ?proc rdfs:lab ?lab}
```

According to embodiments, visualization client 112 transforms received RDF query information that is not in SPARQL CONSTRUCT form into the CONSTRUCT form, which is then submitted to database server 132 to run over RDF database 140, as described in further detail below.

Visualization client 112 may receive any type of information to define the base query, with a set of triple patterns being one possible type of information that defines an RDF query. Furthermore, embodiments herein are described in the context of SPARQL queries which is an example RDF query language. However, embodiments are not limited to any particular RDF query language.

Example RDF query definition GUI 300 accepts one or more triple patterns that define a SPARQL query. In the example depicted in GUI 300, triple pattern controls 310-324 receive triple pattern information that defines a base SPARQL query (though any number of triple patterns may be input into GUI 300 according to embodiments). Triple pattern controls 310-324 each comprise three editable fields, of which editable field 330 is an illustrative example. As such, each of the depicted triple pattern controls includes a subject field (in column 302), a predicate field (in column 304), and an object field (in column 306). The fields of a triple pattern control may be implemented by any type of control, such as an editable text box, a drop down list, etc.

In the example of GUI 300, all of the subjects and objects input into triple pattern controls 310-324 are variables (as indicated in example GUI 300 by the preceding "?" character), however one or more of these fields may include a value rather than a variable. Furthermore, the predicates input into the fields of column 304 are URIs. According to embodiments, predicates of triple patterns in a base query may be represented instead by variables, the facets of which may be explored and selected as represented herein. In this case, the facets would be computed in the same way as facets for the object of a triple. According to embodiments, a user accesses the facets of predicates by selecting a right-click menu on an edge associated with the predicate.

At step 204, a base result set is computed for the base RDF query. For example, visualization client 112 detects that a user has completed input of the base query in GUI 300 and, in response, causes database server 132 to compute a base result set, comprising the results of the base query, from RDF database 140. A user may indicate completion of the base query in any way, e.g., via activation of a run query control 340 depicted in example GUI 300.

Database server 132 computes a base result set that comprises the solutions for the base RDF query in the data stored at RDF database 140. More specifically, the data in the base result set comprises those triples, stored in RDF database 140, that match the triple patterns of the base query. Thus, the base result set comprises those triples with one or more values that bind to the variables that are included in the base query.

According to embodiments, database server 132 causes the base result set to be materialized within RDF database 140, i.e., at materialized result set 142. For example, materialized result set 142 materializes the base result set in a relational table with a respective column storing the facets for each variable represented in the base query. As a further illustration, each row of such a relational table represents solution bindings for the variables represented by the (k) columns.

All incremental updates that successively refine a base query will result in a query version that has a result set that will be found within materialized result set 142. In other words, the result set for any updated query version (that is created by replacing a variable, in a base query, with a facet of the variable) is a subset of the base result set. Thus, materialization of the base result set allows database server 132 to quickly compute, from a single table, information needed to allow a user to quickly perform successive refinements to the base query, such as the number of facets that match a particular variable, and a number of triples included in a result set for an updated version of the base query.

Query Version Control Display

According to embodiments, in response to detecting completion of user input of the base query, visualization client 112 displays a query version control display that includes a graphical representation of the base query such as base query graph 400 of FIG. 4. The query version control display of FIG. 4 also includes a query refinement GUI 420 that depicts the triple patterns of the base query. A query version control display includes one or both of a query refinement GUI and a query graph, as described in embodiments herein, and may include other visualizations according to particular embodiments.

Since the base query is now the current query displayed in a query refinement GUI, which allows the user to explore facets of the query, the base query is considered the "working" query version. A working query version is the version of the query that the user is currently exploring, e.g., via a query refinement GUI. In other words, the working query is the query from which any facet substitutions are based and the query for which a result set may be immediately viewed.

Query graph 400 depicts the subjects and objects of the working query version (which is the base query in the depicted example) as nodes, such as node 412 that depicts the variable "name", and also depicts the predicates in the working query version as edges. The edges are directional, with the source node of an edge representing the subject of a particular triple pattern, the destination node of the edge representing the object of the triple pattern, where the edge represents the predicate of the triple pattern. For example, the triple pattern labeled "triple pattern 1" in GUI 420 is represented in query graph 400, where the subject of the triple pattern ("bill_uri") is represented at node 402, the predicate of the triple pattern (labeled "title") is represented at edge 404, and the object of the triple pattern ("bill title") is represented at node 406, with edge 404 pointing toward object node 406.

The labels of the nodes in base query graph 400 also indicate the number of facets with which each variable is associated. To illustrate, node 412 has the label "?name (50)", which indicates that the variable "name" has 50 facets within the working query result set, which, in the case of query graph 400, is the base query result set.

Refining the Base Query

Once the base result set is computed and materialized, embodiments allow the user to incrementally refine the base query. Continuing with flowchart 200 of FIG. 2, at step 206, a set of possible values, which are included in the base result set, is determined for a particular variable in the base RDF query. For example, database server 132 identifies, in the materialized result set 142, all of the facets that are bound to a particular variable in the base query.

According to an embodiment, database server 132 identifies the set of facets in materialized result set 142 for each variable, respectively, in the base query once the base result set is materialized. According to another embodiment, database server 132 identifies the set of facets in the materialized result set for a particular variable in response to the user requesting facet information for the particular variable. Database server 132 may identify information for facets of a variable based, at least in part, on sampling (as described in further detail below).

At step 208, one or more of the set of possible values for the particular variable in the base RDF query is caused to be displayed in a graphical user interface. For example, visualization client 112 provides to the user, via the query version control display, the ability to explore information about the facets of variables in the working query version.

A user may explore the facets of a given variable in any manner within embodiments. For example, in a query refinement GUI, such as GUI 420 of FIG. 4, the variables are represented, respectively, by selectable controls. As another example, query graphs, such as query graph 400 of FIG. 4, include node graphical controls that represent variables in the working query version. A user requests additional information about variable facets by activating a control associated with the variable. According to an embodiment, fields including URIs or literals are not associated with selectable controls in a query refinement GUI.

To illustrate the functioning of GUI 420, a user activates control 430 thereby issuing, to visualization client 112, a command to display information about the variable "name". In response to a user command to display information about a particular variable (such as activation of a control associated with the variable), visualization client 112 gives the user the ability to explore the facets of the particular variable. According to an embodiment, visualization client 112 displays a list of information about the facets of the particular variable. According to an embodiment, the information for the facets of the particular variable is accessible via one or more menus that allow the user more control over the amount of information that is displayed to the user.

Figure 5:
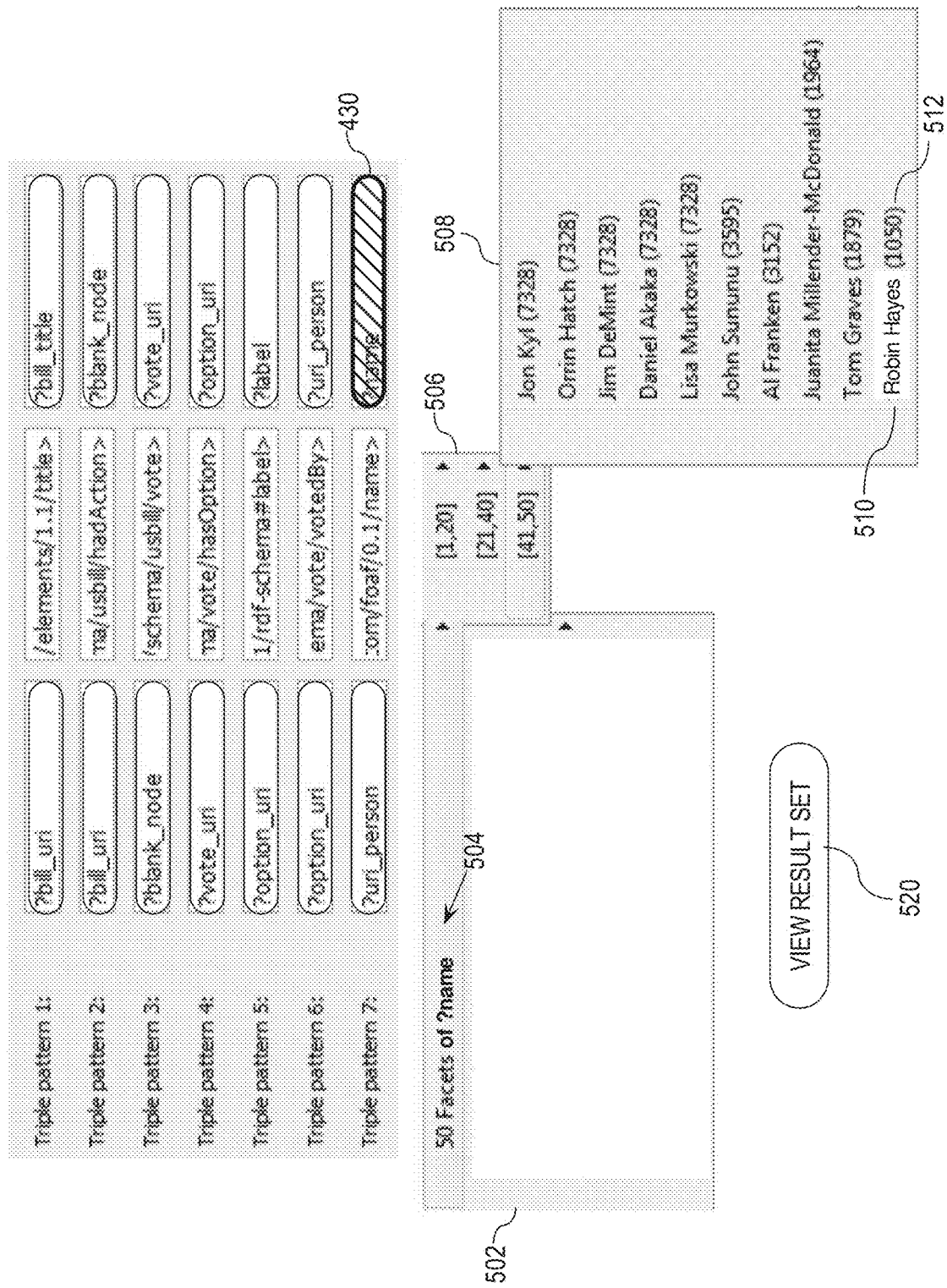
FIG. 5 depicts an example graphical user interface that displays menus allowing exploration of facets of the variables in a working query.

FIG. 5 depicts an example query refinement GUI 500 that displays menus allowing exploration of facets of the variables in a working query. Specifically, GUI 500 depicts a menu 502, submenu 506, and submenu 508 configured to allow a user to explore the facets of the selected variable (e.g., "name") within the working result set, which is the result set of the working query version. According to an embodiment, user activation of control 430 or of node 412 displays menu 502 of query refinement GUI 500.

Menu 502 includes one or more options that the user may select for exploring the variable "name". The options in menu 502 include at least the ability to explore the facets, of the selected variable, that are found within the working result set, i.e., at option 504 labeled "50 Facets of ?name". The label of option 504 includes the number of facets of the subject variable within the working result set.

A user may explore the facets of the selected variable ("name") by activating option 504 (e.g., by rolling over or clicking on the control that represents option 504). According to embodiments, visualization client 112 allows the user to browse the facets of the subject variable in any manner. According to the example of FIG. 5, activating option 504 displays submenu 506, which includes options to view groups of facets of the variable "name". In this example, visualization client 112 splits the relatively large number of facets for "name" into smaller groups of facets (e.g., of at most 20 facets per group) and provides to the user, in submenu 506, access to those groups of facets. According to another embodiment, not depicted in GUI 500, visualization client 112 provides all of the variable facets in a single submenu, e.g., upon activation of option 504.

In the example of FIG. 5, visualization client 112 displays submenu 508 in response to activation of the option labeled "[41,50]" in submenu 506 (i.e., by rolling over or clicking on the option control). Submenu 508 depicts a list of facets of the variable "name" comprising the last ten facets in the list of 50 facets that are associated with "name" in the working result set, i.e., numbers 41-50.

According to embodiments, a list of facets that visualization client 112 displays for a selected variable includes, with the facet values, the numbers of bindings of the facet values within the working result set. For example, the list of facets of "name" displayed in submenu 508 includes the value 510 ("Robin Hayes") and the number of solutions 512 that include value 510 (i.e., "1050") within the base result set, which is the working result set in the example of GUI 500. This information allows a user to understand the impact of substituting particular facet values for the selected variable in the working query version. To illustrate, if the user substitutes the variable "name" with value "Robin Hayes", then the new working result set would include only the 1050 solutions that include "Robin Hayes" bound to the variable "name".

For ease of explanation, utilization, by a user, of a query version control display such as depicted in FIG. 4 or FIG. 5 (etc.) to explore facets of variables within the working query version is referred to herein as "exploring variable facets".

At step 210, information indicating user selection of a particular value of the set of possible values for the particular variable is received via the graphical user interface. For example, visualization client 112 detects user selection of value 510 (i.e., "Robin Hayes") in submenu 508, which may be done in many ways according to embodiments. A user may select the value "Robin Hayes" for the variable "name" by clicking on a control that represents "Robin Hayes" when "name" is the selected variable. A user may select value 510 to substitute for the variable "name" by dragging and dropping a control that represents value 510 over the portion of the GUI that depicts the variable "name".

At step 212, in response to receiving the information indicating user selection of the particular value, an updated RDF query is determined based, at least in part, on the base RDF query and the particular value. For example, user selection of a particular facet for a particular variable indicates, to visualization client 112, a user command to modify the working query version (which is the base query in the example of GUI 500) by substituting the selected facet for the particular variable. Thus, in response to receiving the information indicating user selection of the value "Robin Hayes" for the variable "name", visualization client 112 creates a modified version of the working query version (which is the base query at the time the user selected the facet of "name" in the above example) in which the value "Robin Hayes" is substituted for the variable "name".

In connection with updating the working query version, visualization client 112 also populates the query version control display with the information for the new working query version. As such, the query being displayed to the user in a query refinement GUI is the working query version, which, in this case, is the query that has been most recently produced by the user. According to embodiments, a user may also set the working query version to a particular query version that is not the most recently produced query version by selecting a particular query version in a query history graph (as described in further detail below).

FIG. 6 depicts an updated query version control display with a query refinement GUI 600 that is populated with information for the new working query version, i.e., the modified base query in which the value "Robin Hayes" has been substituted for the variable "name". According to an embodiment depicted in GUI 600, the value "Robin Hayes" is displayed in a text field 630, and is no longer associated with a selectable control, which indicates to a user that a value has been selected for the associated variable. According to another embodiment, the value "Robin Hayes" is associated with a selectable button, activation of which provides the user with the ability to select another facet (or facets) to substitute for the variable "name".

Visualization client 112 also displays, in the query version control display, an updated query graph 610 that depicts the new working query version. Node 612 of updated query graph 610 depicts the value that has been selected for the variable "name", which occupied the node in the location of node 612 in base query graph 400 (FIG. 4), i.e., at node 412. A user may access query graph metadata, such as the name of a variable that has been substituted, a username of a user that performed the substitution, a timestamp of the substitution, etc. For example, a user may access query graph metadata by rolling over a node or edge in the query graph, which displays information about the associated entity.

According to an embodiment, nodes that have been updated in a query graph are visually highlighted, an example of which is depicted in FIG. 6 by visual indicator 614. Visual indicator 614 indicates that node 612 has been modified. According to one embodiment, visual indicator 614 indicates that node 612 bears the most recent modification made to the working query version. According to an embodiment, any node that has been changed from the original state in the base query version bears a marking such as visual indicator 614.

A query graph in the query version control display is automatically updated each time the user changes the working query version, thereby continually providing the user with graphically-represented information describing the working query version and also the working result set (e.g., cardinalities of facet values for variables in the working query depicted in the query graph). Thus, the query graph supplements the understanding of the user with regard to the working query version.

According to an embodiment, visualization client 112 receives information indicating user selection of a particular value for a particular variable when the user selects a value to replace a variable. According to another embodiment, visualization client 112 receives information indicating user selection of a particular value for a particular variable when the user selects a control configured to submit modifications to the working query version to database server 132 as a new query version. In this embodiment, the user may make as many changes as desired before causing the system to update the working query version and identify the result set of the updated query.

At step 214, an updated result set is computed for the updated RDF query. For example, visualization client 112 causes information for the updated query version to be submitted to database server 132, which identifies a result set for the updated query within materialized result set 142. Continuing with the previous example, database server 132 identifies (as the working result set) the set of solutions, in materialized result set 142, that include bindings of the value "Robin Hayes" to the variable "name".

According to an embodiment, visualization client 112 causes database server 132 to identify an updated result set for a working query version when an updated query version is identified by the user. According to another embodiment, visualization client 112 causes database server 132 to identify an updated result set for a working query version when the user requests visualization of the results of the query. For example, visualization client 112 provides the user with a view result set control 620 that allows the user to show the results of the working query version. In response to detecting activation of view result set control 620, visualization client 112 causes database server 132 to identify an updated result set for the working query version.

According to embodiments, the cardinalities of facet values displayed in the query graph that represents the working query version, such as query graph 610, change to reflect the cardinalities of variable facets within the new working result set. For example, database server 132 determines that the number of facet values associated with the variable "uri_person" in the updated working result set is (1) and causes visualization client 112 to display "uri_person (1)" in node 616 to automatically display the cardinality of the facets of the variable within the working result set.

At step 216, information for said updated result set is provided to the particular client. For example, according to an embodiment, visualization client 112 receives the result set information from database server 132 and automatically displays it, i.e., because the result information was calculated based on user's activation of view result set control 620.

According to another embodiment in which result sets are calculated in response to receiving information for a new query version, visualization client 112 detects a user command to view the result set of the working query version based on user activation of view result set control 620. In response to detecting activation of control 620, visualization client 112 causes the pre-calculated working result set to be displayed to the user. According to an embodiment, the result set is displayed as a graph.

Example Progression of Facet Substitutions

Visualization client 112 allows any number of facet substitutions for variables to create any number of query versions. For example, a user may activate any control associated with any variable displayed in a query refinement GUI, in response to which visualization client 112 provides the user with the ability to explore the facets of the selected variable and perform substitution of one or more facets for the variable in the working query version.

Figure 7:
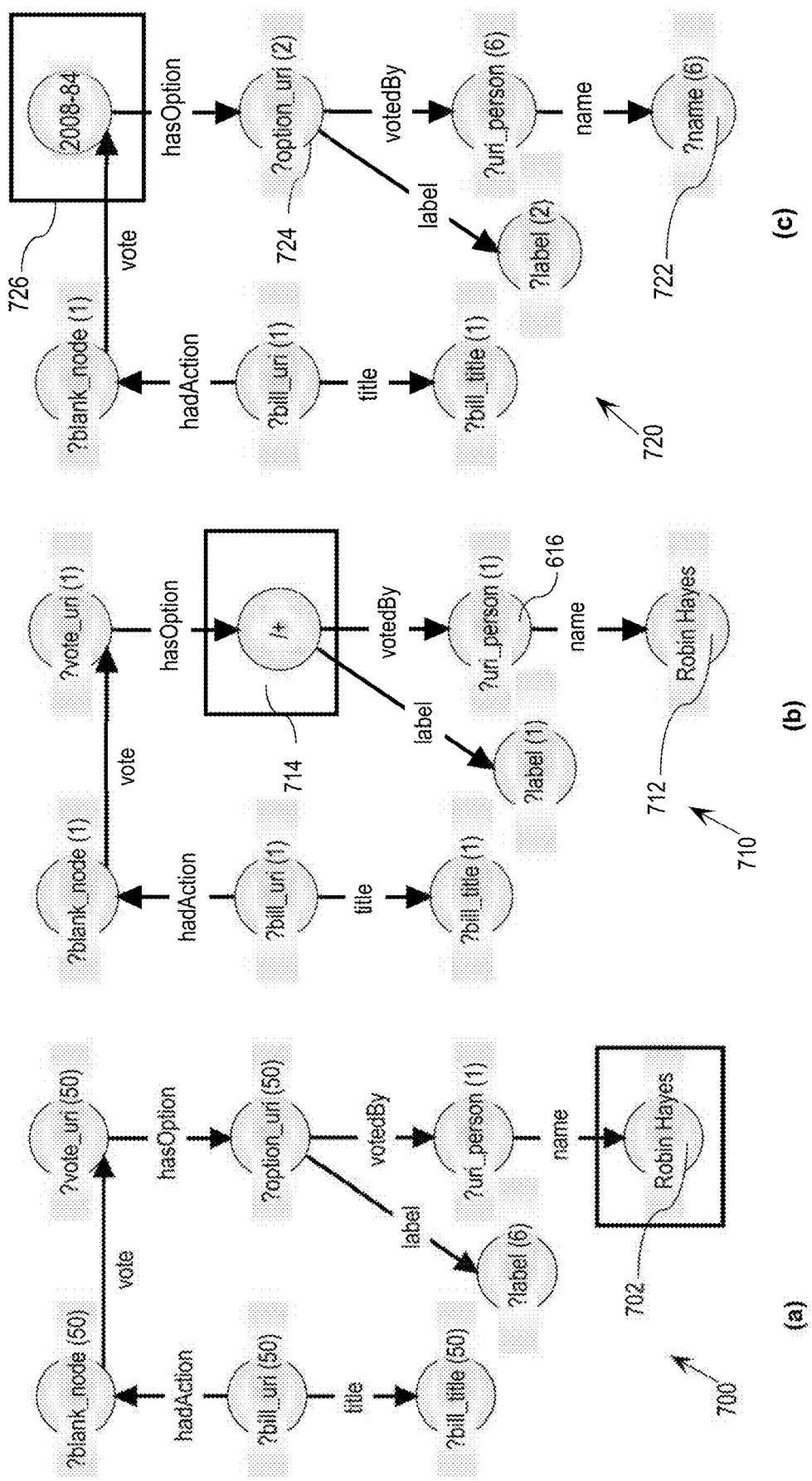
FIG. 7 depicts a series of query graphs that show incremental changes to the base query.

FIG. 7 depicts a series of query graphs 700, 710, and 720 that show incremental changes to a base query. In the depiction of FIG. 7, a user updates a base query as shown in query graph 700, then updates the query shown in query graph 700 as shown in query graph 710. Then, the user returns to the base query and creates a new query version depicted in query graph 720 that is based on the base query and not on the query version depicted in query graphs 700 or 710.

More specifically, in query graph 700, only node 702 represents a variable that has been substituted. Query graph 710 represents an updated query in which both node 712 (corresponding to node 702 in query graph 700) and also node 714 have been substituted with particular variable facets, with the variable associated with node 714 (i.e., "option_uri") having been replaced with the value "/+". Query graph 720 represents an updated query in which only the variable associated with node 726 (i.e., "vote_uri") has been substituted with the value "2008-84". No other nodes in query graph 720 have been substituted with variable facets.

The Query History Graph

According to embodiments, visualization client 112 tracks the query versions that the user produces and allows the user to easily revisit (i.e., view and further modify) versions of the query that the user has previously produced. FIG. 8 depicts a flowchart 800 for depicting a query history graph that represents versions of the base query that have been produced by the user.

At step 802 of flowchart 800, information for a first RDF query version is received from a particular client. For example, visualization client 112 receives information for a base query as depicted in GUI 300 of FIG. 3. As described above, upon receiving information for the base query, visualization client 112 submits the base query to database server 132 to identify the base result set.

As another example of step 802, visualization client 112 receives a request, e.g., via a query refinement GUI, to create a new working query version by substituting a facet of a particular variable in a current working query version for the particular variable. To further illustrate receiving information for a first RDF query version, visualization client 112 displays, via query refinement GUI 420, the base query version. The user, also via GUI 420/GUI 500, creates a modified version of the base query in which the value "Robin Hayes" is substituted for the variable "name" as described in detail above.

At step 804, in response to receiving the information for the first RDF query version, a first graphical control, that represents the first RDF query version, is caused to be displayed at a graphical user interface. For example, in response to receiving the information for the modified version of the base query, in which the facet "Robin Hayes" is substituted for the variable "name", visualization client 112 displays a graphical control, in a query history graph, that represents the newly updated query version for which information has been received.

A query history graph tracks the changes that a user is making to the base query by displaying a node that represents the query version that results from each incremental update that the user makes to the base query. More specifically, a query history graph is a tree graph where the nodes of the tree represent versions of the base query and the edges in the tree represent incremental changes that produced the query versions.

The root node of the query history graph represents the base query version without modification. Each child node of the query history graph is a modified version of the base query, where the modifications are represented by those edges that are traversed from the root node to arrive at a particular node within the tree structure. According to embodiments, an edge graphical control in a query history graph represents a directed edge that directs from (a) a first node graphical control that represents a query version that is more general (and more like the base query) to (b) a second node graphical control that represents a query version that is less general (and less like the base query). Node graphical controls are referred to herein as "nodes" and edge graphical controls are referred to herein as "edges" for ease of explanation.

Figure 9A:
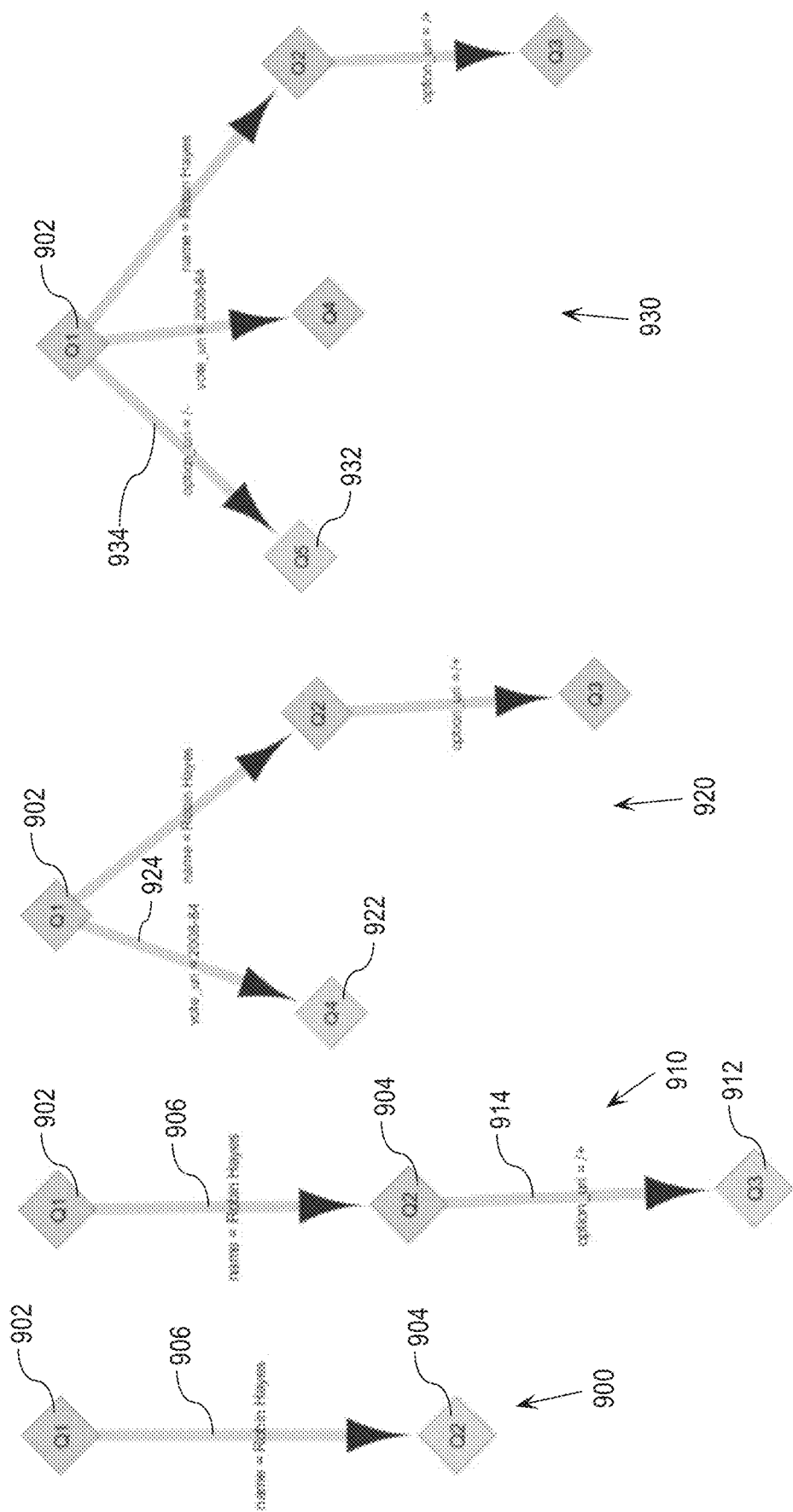
FIGS. 9A-9B depict a series of query history graphs, which track the progress of a single query history graph that changes as a user creates modified versions of a base query.

To illustrate, in query history graph 910 of FIG. 9A, node 912 depicts a query "Q3". The differences between "Q3" and the base query are identifiable based on the labels of the edges that are traversed when traversing the path between the root node (node 902) and node 912. Thus, in "Q3", the value "Robin Hayes" has been substituted for the variable "name" (as indicated by edge 906) and the value "/+" has been substituted for the variable "option_uri" (as indicated by edge 914).

To illustrate progression of a query history graph, FIG. 9A depicts a series of query history graphs 900, 910, 920, and 930, which track the progress of a single query history graph that changes as a user creates new versions of a base query. Query history graph 900 depicts a node 902 that represents the base query ("Q1") and a node 904 that represents a modified version of the base query ("Q2") in which the value "Robin Hayes" is substituted for the variable "name" as indicated by edge 906.

According to an embodiment, visualization client 112 causes a graphical control, such as node 902, to be displayed in a query history graph in response to the user submitting the base query to be run against RDF database 140 (as depicted in, and described in connection with, GUI 300 of FIG. 3). According to another embodiment, visualization client 112 causes a graphical control, such as node 902, to be displayed in a query history graph in response to the user submitting the first incremental update to the base query. At this point, visualization client 112 causes at least both of node 902 (representing the base version of the query) and a second node, such as node 904, representing the updated query version to be displayed. Visualization client 112 causes edge 906 to be displayed when node 904 is displayed.

Node 904 is visually highlighted in query history graph 900 to indicate that the node represents the working query version. Thus, according to an embodiment, query history graph 900 is displayed in connection with a query refinement GUI displaying the query version named "Q2" as the working query.

Returning to flowchart 800, at step 806, after receiving the information for the first RDF query version, second information for a second RDF query version is received; wherein the second RDF query version is based on the first RDF query version; and wherein, in the second RDF query version, a particular value is substituted for a particular variable included in the first RDF query version. For example, visualization client 112 receives a user command to substitute a facet of a particular variable in the working query version for the particular variable to produce a new working query version.

Continuing with the example of step 804 above, visualization client 112 causes query refinement GUI 600 of FIG. 6 to be displayed, which allows the user to further view, explore, and refine the working query version in which the value "Robin Hayes" is substituted for the variable "name". This working query version is the query associated with node 904, of FIG. 9A or "Q2".

In this example, the user explores facets of the variable "option_uri", via selection of control 632 associated with the variable "option_uri", and selects the value "/+", which is a facet of the variable "option_uri", to replace the variable "option_uri" within a new version of the base query. According to embodiments, selection of the value to replace the variable "option_uri" sends the information for the new query version to visualization client 112.

Figure 10:
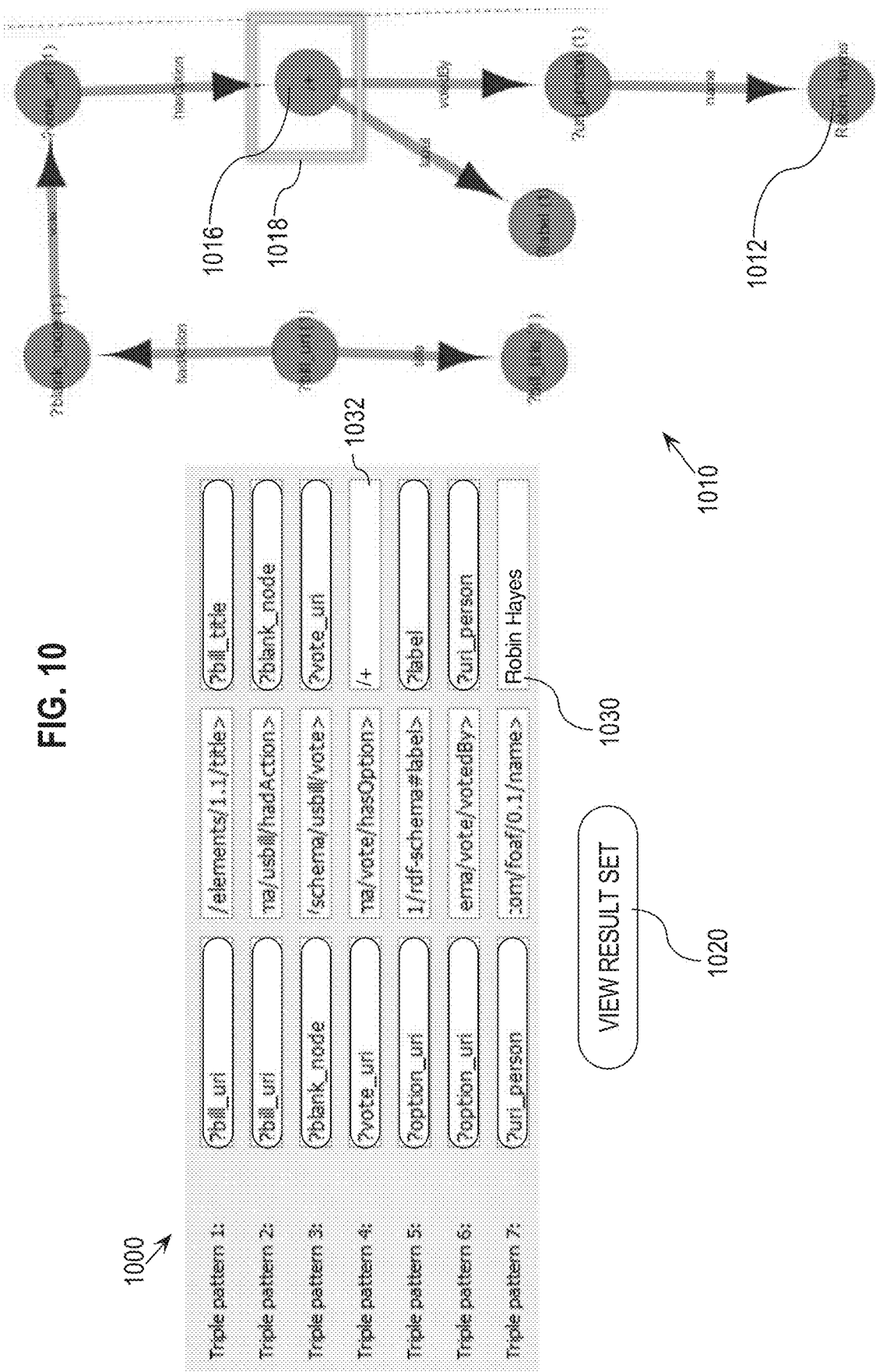
FIG. 10 depicts a query refinement graphical user interface and a query graph that are populated with information for an updated working query version.

In response to receiving this information, visualization client 112 automatically creates a new working query version based on the indicated variable substitution and the previous working query version ("Q2"). Visualization client 112 populates the query version control display with the new working query version, e.g., as in FIG. 10 that depicts a query refinement GUI 1000 that displays the new working query version in which the value "/+" has been substituted for the variable "option_uri" as indicated in field 1032. Updated query graph 1010 also reflects the features of the new working query version in that node 1016 depicts the value "/+" instead of the variable name that the value replaced. Also, node 1016 is associated with visual highlight 1018, indicating that this change was the last one made to the working query version displayed in GUI 1000.

At step 808, in response to receiving the second information for the second RDF query version: both the first graphical control and a second graphical control that represents the second RDF query version are caused to be displayed at the graphical user interface, wherein the second graphical control is distinct from the first graphical control. For example, visualization client 112 adds a node, that represents the newest version of the query, to the query history graph showing incremental updates to the current base query.

To illustrate, in response to receiving information for the new query version described in the example for step 806, visualization client 112 adds node 912 (corresponding to query version "Q3") to the query history graph 900 to produce query history graph 910. The query version "Q3" is based on the base query and includes both substitutions of "Robin Hayes" for the variable "name" and "/+" for the variable "option_uri". Furthermore, visualization client 112 connects nodes 904 and 912 with edge 914 to indicate the incremental change performed on the query version "Q2" represented by node 904 that produced the query version "Q3" represented by node 912.

According to embodiments, visualization client 112 creates a new node and edge in the query history graph for each new query version to track the user's progress through successive refinement of the base query. Since the query history graph communicates, to the user, the changes that have been made to the base query, the query history graph is useful to show the user what variable replacement combinations the user has already explored.

Metadata of a Query History Graph

Furthermore, according to embodiments, the query history graph displays additional information regarding the query versions in addition to what is depicted in FIG. 9A, including one or more of: timestamp indicating query version creation time; selectivity of the query version (i.e., how many solutions are in the result set for a given query version); information identifying a user that created the query version; etc. Such additional information may be presented in any manner, including displayed as a result of the user rolling over or clicking on a graphical control in the query history graph. The additional information may be implemented as metadata stored for the query version.

For example, a user rolls over node 904 to display metadata that is associated with the node, such as a timestamp marking when the query version associated with the node was initially created, information identifying a user that produced the query version, etc. As a further example, a user rolls over edge 906 to display metadata that is associated with the edge, such as a timestamp marking when the edge was initially created, information identifying a user that caused the edge to be displayed, etc.

According to embodiments, visualization client 112 allows the user to annotate the query history graph, i.e., by adding and/or editing at least certain fields of the metadata for a query version (edge and/or node) in the query history graph, e.g., label, graphical control visualization style, etc. The visualization style of a graphical control includes control color, control size, control shape, font type, font style, font size, etc. In this manner, the user customizes the information displayed by the query history graph. For example, through visualization client 112, a user changes the color of one or more graphical controls in the query history graph, edits one or more labels in the graph, and adds comments to one or more of the graphical controls (which are displayed, e.g., upon roll-over or on-click of the graphical control).

Furthermore, a user may remove one or more nodes, representing updated versions of the base query, from the query history graph. According to an embodiment, in response to a request to remove a node, visualization client 112 ceases to display the removed nodes and any edges that connected the removed nodes to the query history graph. If a user removes a node that has child nodes, the child nodes are also removed.

Refining Past Versions of the Base Query Via the Query History Graph

A user may activate any node in a query history graph to cause the associated query version to become the working query version. In this manner, the user may select any node in a query history graph to explore and further refine the associated query version, including arbitrary intermediate levels as well as a leaf or root node.

For example, after creating query version "Q3" as indicated in query history graph 910, the user decides to start again from the base query version. To do so, the user activates node 902, which causes the associated query version (which is the base query) to be the working query version. In response to detecting activation of node 902, visualization client 112 causes the information for the base query to populate a query version control display, which allows the user to view the query version as the working query version and explore facets of the variables in the query version. Visualization client 112 also visually highlights node 902 in the query history graph to designate the associated query version "Q1" as the working query version.

As shown in the example query history graph 920, the user refines the base query by substituting the value "2008-84" for the variable "vote_uri" included in the base query. In response to the user's selection of a facet of a variable in the base query to replace the variable in a new query version, visualization client 112 creates the new query version, which is now the working query version (as described above), and also causes a new node 922 to be displayed in the query history graph 920. Node 922 is connected to node 902 by an edge 924, which indicates the substitution that was made to achieve the query version associated with node 922.

According to the example depicted in query history graph 930, the user again returns to the base query version represented by node 902 and incrementally updates the base query by substituting the variable "option_uri" in the base query with the variable facet "/–". In response to receiving this information for a new query version, visualization client 112 creates the new query version, which is now the working query version (as described above), and also causes a new node 932 to be displayed in the query history graph 930. Node 932 is connected to node 902 by an edge 934, which indicates the substitution that was made to achieve the query version associated with node 932.

Figure 9B:
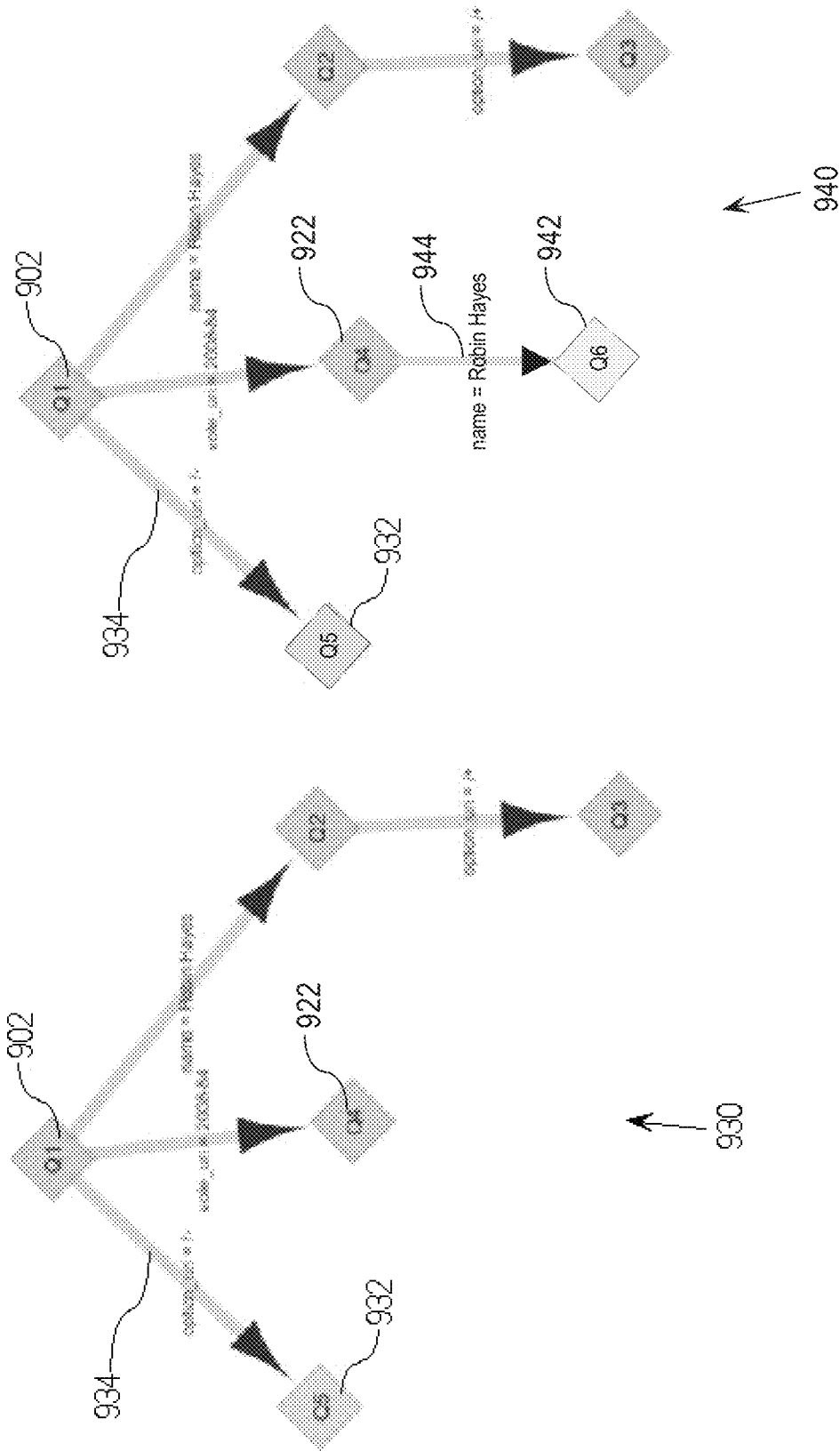

A user may view and refine any query version represented in the query history graph. To illustrate, FIG. 9B depicts query history graph 930 (which is the same as query history graph 930 of FIG. 9A) and also depicts query history graph 940. Query history graph 940 depicts a new query version that the user produces based on a query version depicted in query history graph 930.

Specifically, a user selects node 922 in query history graph 930 to be the working query version, which causes visualization client 112 to designate the query version ("Q4") associated with node 922 as the working query version. Accordingly, visualization client 112 displays query version "Q4" (which is the base query version with one variable "vote_uri" substituted out for the variable facet "2008-84") in the query version control display for the user to explore.

Working on query version "Q4", the user substitutes the variable facet "Robin Hayes" for the variable "name", which causes visualization client 112 to create a new query version "Q6" with the features of query version "Q4" and also with the new variable substitution indicated in the received information. Visualization client 112 displays node 942 in query history graph 940 to represent this newly-created query version. Visualization client 112 also displays edge 944 between nodes 922 and 942 to depict the further refinement of "Q4" by substituting "Robin Hayes" for the variable "name". Visualization client 112 also populates the query version control display with the query version "Q6".

As the user incrementally updates the base query, the query history graph tracks those changes such that the user may freely explore the variable facets of the base query without worrying that a promising line of thought will be lost. Furthermore, information in the query history graph allows the user to easily communicate, to other parties, the exploration that the user has performed regarding facets of the base query.

Displaying the Visualizations

The different aspects of the query version control display (i.e., one or more of the query refinement GUI, facet exploration menus, query graph, and query history graph) may be available in panels of a main GUI displayed to the user at a display device of client device 110, may be available in distinct screens accessible via tab or toggle controls (allowing the user to fill a main GUI display with a particular aspect of the query version control display via activating a desired tab corresponding to the desired aspect of the query version control display), or any combination thereof according to implementations.

For example, a user may first request a screen that displays a query refinement GUI with the current working query version and a query graph depicting the working query version. The user may then request a second screen that displays a query history graph. The user may activate (e.g., by clicking on) a node of the displayed query history graph, which automatically causes the query version associated with the node to become the working query version and also automatically brings up the first screen populated with information for the newly-appointed working query version.

Computing the Query Version Results in Real Time

According to embodiments, once the base result set is materialized, all computations for incremental updates to the base query are performed in real time, i.e., with very little lag. This is accomplished by utilizing the mirroring techniques described in application Ser. No. 14/337,179, incorporated herein by reference, which facilitate rapid computation of result sets and other information for incrementally-updated queries.

For example, database server 132 computes facet counts for each version of the base query that the user creates such that, when the user explores a newly-created working query version, database server 132 provides visualization client 112 with facet count information (and potentially other information) that is specific to the working result set for the newly-created working query version. Because these values are calculated in real time, all information displayed for any given query version accurately reflects the query result set for the given query version (i.e., based on database server 132 identifying required information for updated result sets from materialized result set 142).

According to embodiments, database server 132 uses sampling to calculate result set information for a given updated query version. Sampling can be used to speed up calculations that would otherwise cause the system to lag. For example, when a result set exceeds a threshold size, e.g., 1 billion triples, database server 132 uses sampling to estimate information for the result set, such as facet counts.

For example, database server 132 utilizes sampling functionality (such as sampling functionality natively supported in the Oracle Database) to return a sample of data from a table. To illustrate, database server 132 utilizes a SAMPLE clause to perform sampling, in the following query, which returns 10% of the rows from the table "emp":

```
SELECT *
   FROM emp SAMPLE (10)
```

According to embodiments, database server 132 translates the base RDF query into an equivalent query on underlying tables, in RDF database 140, that hold the queried RDF data. For example, RDF_LINK$ holds edge information, and RDF_VALUE$ holds node and edge label information. The translated query (which may be in a format other than the RDF query format, such as SQL) may involve one or more self-joins, e.g., on RDF_LINK$ followed by one or more joins on RDF_VALUE$. The following query illustrates such a translated query:

```
SELECT ...
   FROM RDF_LINK$ e1, RDF_LINK$ e2, RDF_LINK$ e3,
      RDF_VALUE$ n1, RDF_VALUE$ n2
      WHERE ...
```

According to embodiments, database server 132 reduces the amount of data returned for a query by sampling data from the starting table in pair-wise joins indicated in the translated query. For example, if the translated query performs a pair-wise join as follows ((e3 JOIN e1) JOIN e2), then database server 132 injects a SAMPLE clause with a particular sample percentage on e3 (which is the starting table in the join). Such insertion may be implemented as follows: ((({e3 SAMPLE (10)} JOIN e1) JOIN e2). The sample percentage may be automatically determined, set to a default percentage, supplied by the user or client that initiates the base query, etc. Furthermore, the cardinality estimates obtained using the above sampling process are multiplied by a factor (100/sample_percentage) before being displayed in a GUI.

To further illustrate sampling, database server 132 uses sampling to estimate that there are "200+" facet values for a particular variable in a working query version, which is the cardinality that visualization client 112 displays for the particular variable when the user is exploring the facets of the working query version. According to embodiments, database server 132 provides more accurate information (such as a more exact sampling estimation, a precise count, etc.) in response to the user requesting further information about the particular variable, e.g., by selecting a menu option that displays more information about facet values of the particular variable such as submenu 506 of FIG. 5.

For results created using sampling, embodiments estimate facet counts by extrapolation. Furthermore, according to embodiments, database server 132 puts the sample clause on only the left deep node to preserve join selectivity when the base query result is being processed. This gets the desired reduction in size and, at the same time, allows join selectivities to be preserved. For example, in preparing the result set using RDF dataset source formed by self-joins on RDF datasets, sampling is used in the left-most deep RDF dataset source to achieve data reduction.

According to further embodiments, database server 132 utilizes any type of construct (e.g., for materialized result set 142) in order to facilitate visualization of the results of an updated query version in real time, e.g., a bitmap index, columnar representations of data, in-memory tables, etc. According to embodiments, to speed up the facet count computation, database server 132 creates a single column bitmap index on each column of materialized result set 142. According to embodiments, to speed up facet count computation, database server 132 creates a columnar representation of the query result by making the initial materialized result set 142 an in-memory table.

Implementation of the Visualization Client

According to an implementation, visualization client 112 is implemented, at least in part, by Cytoscape. Information for Cytoscape was found at the time of drafting this Application in a document named "what_is_cytoscape.html" on "www.cytoscape.org", the entirety of which is hereby incorporated by reference as if fully set forth herein. Cytoscape is a visualization tool that performs visualizations as attributed to visualization client 112 herein. However, according to embodiments, visualization client 112 may be implemented in any way that allows visualizations as described herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
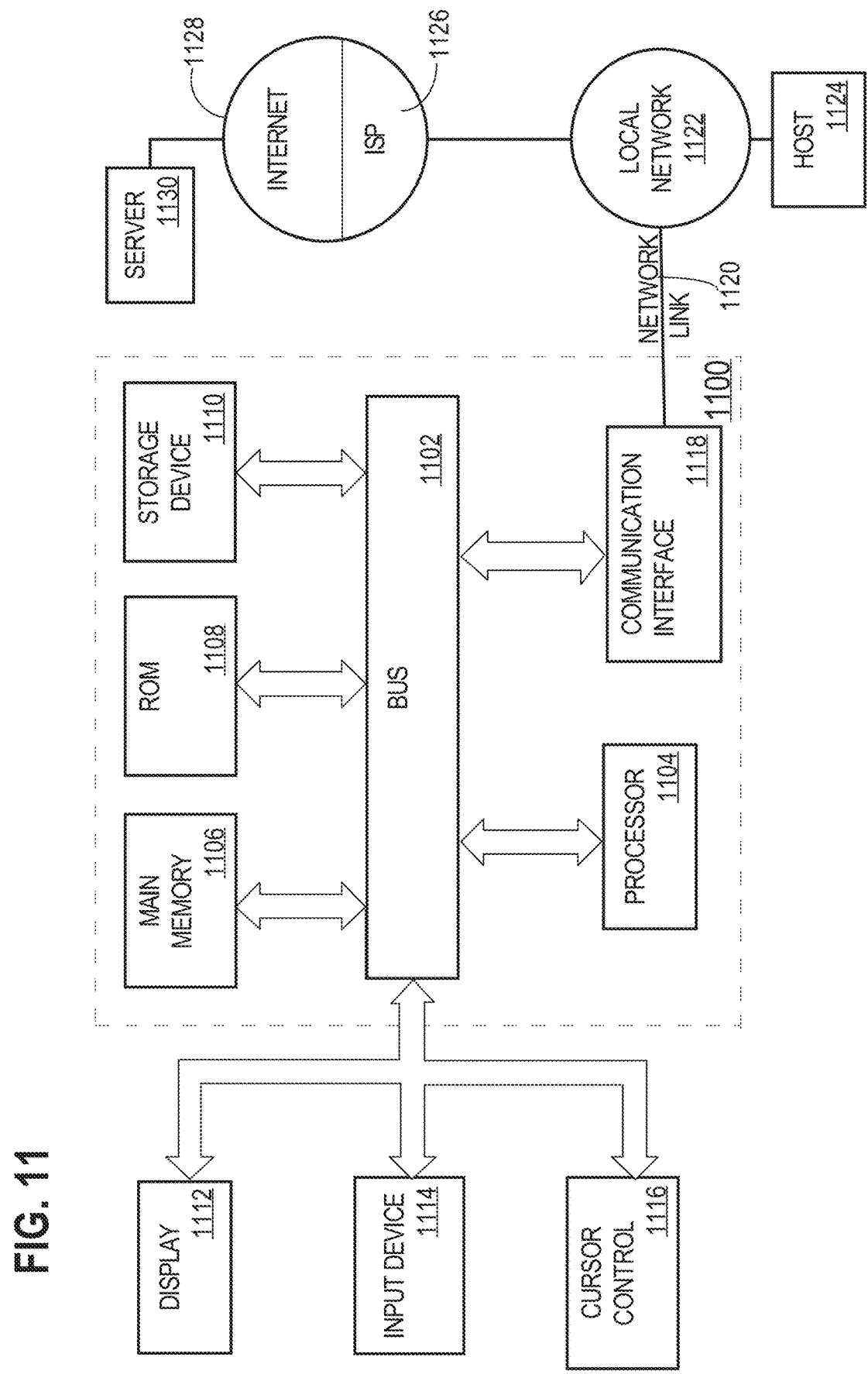
FIG. 11 is a block diagram illustrating a computer system that may be used to implement the techniques described herein.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a particular client, information defining a base RDF query that includes, at least, a set of one or more triple patterns;
   wherein a particular triple pattern of the set of one or more triple patterns comprises a subject, a predicate, and an object;
   wherein one or more of a set of subjects and/or objects included in the set of one or more triple patterns are variables;
   causing display, in a graphical user interface, of a representation of the base RDF query;
   wherein the representation of the base RDF query includes a representation of a particular variable, in the base RDF query, that displays name information for the particular variable;
   computing a base result set for the base RDF query;
   receiving user selection of the particular variable in the base RDF query;
   determining, for the particular variable in the base RDF query, a set of possible values that are included in the base result set;
   causing display, in the graphical user interface, of one or more of the set of possible values for the particular variable in the base RDF query;
   receiving, via the graphical user interface, information indicating user selection of a particular value of the set of possible values for the particular variable;
   in response to receiving the information indicating user selection of the particular value:
      causing the name information for the particular variable in the representation of the base RDF query to comprise the particular value, and
      determining an updated RDF query based, at least in part, on the base RDF query and the particular value;
   computing, from the base result set, an updated result set for the updated RDF query; and
   providing information for said updated result set to the particular client;
   wherein the method is performed by one or more computing devices.

2. The method of claim 1, wherein the information defining the base RDF query further comprises one or more subquery constructs.

3. The method of claim 1, wherein causing display, in the graphical user interface, of one or more of the set of possible values for the particular variable in the base RDF query further comprises: causing display, with a particular possible value of the set of possible values, a number of solutions, in the base result set, that include the particular possible value.

4. The method of claim 3, further comprising identifying, as the number of solutions, an estimated number of solutions based, at least in part, on sampling from the base result set.

5. The method of claim 1, further comprising:
materializing the base result set;
wherein determining, for the particular variable in the base RDF query, the set of possible values that are included in the base result set comprises determining the set of possible values from the materialized base result set; and
wherein computing the updated result set for the updated RDF query comprises computing the updated result set based on the materialized base result set.

6. The method of claim 5, wherein materializing the base result set comprises one or more of:
storing a columnar representation of data for the base result set in an in-memory table; or
creating one or more bitmap indexes, wherein each of the one or more bitmap indexes corresponds to a corresponding column of a table storing the materialized base result set.

7. The method of claim 1, wherein determining the updated RDF query based, at least in part, on the base RDF query and the particular value comprises substituting the particular value for the particular variable within the base RDF query to produce the updated RDF query.

8. The method of claim 1, further comprising:
receiving, via the graphical user interface, second information indicating user selection of a second value of a set of possible values for a second variable in the updated RDF query;
wherein the updated RDF query is a first updated RDF query; and
in response to receiving the second information indicating user selection of the second value:
determining a second updated RDF query based, at least in part, on the first updated RDF query and the second value,
computing a second updated result set for the second updated RDF query, and
providing information for said second updated result set to the particular client.

9. The method of claim 1, further comprising:
wherein the graphical user interface comprises a graphical representation of the base RDF query;
wherein the graphical representation of the base RDF query includes a particular displayed node object that (a) represents the particular variable, and (b) includes a label that displays the name information for the particular variable; and
in response to receiving the information indicating user selection of the particular value:
updating the graphical representation of the base RDF query by replacing the name information of the particular variable, in the label included in the particular displayed node object, with the particular value.

10. One or more non-transitory computer-readable media storing one or more sequences of instructions that, when executed by one or more processors, cause:
receiving, from a particular client, information for a base RDF query that comprises a set of one or more triple patterns;
wherein a particular triple pattern of the set of one or more triple patterns comprises a subject, a predicate, and an object;
wherein one or more of a set of subjects and/or objects included in the set of one or more triple patterns are variables;
causing display, in a graphical user interface, of a representation of the base RDF query;
wherein the representation of the base RDF query includes a representation of a particular variable, in the base RDF query, that displays name information for the particular variable;
computing a base result set for the base RDF query;
receiving user selection of the particular variable in the base RDF query;
determining, for the particular variable in the base RDF query, a set of possible values that are included in the base result set;
causing display, in the graphical user interface, of one or more of the set of possible values for the particular variable in the base RDF query;
receiving, via the graphical user interface, information indicating user selection of a particular value of the set of possible values for the particular variable;
in response to receiving the information indicating user selection of the particular value:
causing the name information for the particular variable in the representation of the base RDF query to comprise the particular value, and
determining an updated RDF query based, at least in part, on the base RDF query and the particular value;
computing, from the base result set, an updated result set for the updated RDF query; and
providing information for said updated result set to the particular client.

11. The one or more non-transitory computer-readable media of claim 10, wherein the information defining the base RDF query further comprises one or more subquery constructs.

12. The one or more non-transitory computer-readable media of claim 10, wherein causing display, in the graphical user interface, of one or more of the set of possible values for the particular variable in the base RDF query further comprises: causing display, with a particular possible value of the set of possible values, a number of solutions, in the base result set, that include the particular possible value.

13. The one or more non-transitory computer-readable media of claim 10, wherein the one or more sequences of instructions further comprise instructions that, when executed by one or more processors, cause:
materializing the base result set;
wherein determining, for the particular variable in the base RDF query, the set of possible values that are included in the base result set comprises determining the set of possible values from the materialized base result set; and
wherein computing the updated result set for the updated RDF query comprises computing the updated result set based on the materialized base result set.

14. The one or more non-transitory computer-readable media of claim 13, wherein materializing the base result set comprises one or more of:
storing a columnar representation of data for the base result set in an in-memory table; or creating one or more bitmap indexes, wherein each of the one or more bitmap indexes corresponds to a corresponding column of a table storing the materialized base result set.

15. The one or more non-transitory computer-readable media of claim 10, wherein determining the updated RDF query based, at least in part, on the base RDF query and the particular value comprises substituting the particular value for the particular variable within the base RDF query to produce the updated RDF query.

16. The one or more non-transitory computer-readable media of claim 10, wherein the one or more sequences of instructions further comprise instructions that, when executed by one or more processors, cause:
receiving, via the graphical user interface, second information indicating user selection of a second value of a set of possible values for a second variable in the updated RDF query;
wherein the updated RDF query is a first updated RDF query; and
in response to receiving the second information indicating user selection of the second value:
determining a second updated RDF query based, at least in part, on the first updated RDF query and the second value,
computing a second updated result set for the second updated RDF query, and
providing information for said second updated result set to the particular client.

17. The one or more non-transitory computer-readable media of claim 10, wherein the one or more sequences of instructions further comprise instructions that, when executed by one or more processors, cause:
wherein the graphical user interface comprises a graphical representation of the base RDF query;
wherein the graphical representation of the base RDF query includes a particular displayed node object that (a) represents the particular variable, and (b) includes a label that displays the name information for the particular variable; and
in response to receiving the information indicating user selection of the particular value:
updating the graphical representation of the base RDF query by replacing the name information of the particular variable, in the label included in the particular displayed node object, with the particular value.

18. The one or more non-transitory computer-readable media of claim 12, wherein the one or more sequences of instructions further comprise instructions that, when executed by one or more processors, cause identifying, as the number of solutions, an estimated number of solutions based, at least in part, on sampling from the base result set.

* * * * *